Oct. 7, 1924.

O. E. SZEKELY 1,510,569

AUTOMOTIVE DRIVE MECHANISM

Filed Aug. 21, 1922      4 Sheets-Sheet 1

Inventor,
Otto E. Szekely,
By Offield, Poole, Hinton & Scott

Oct. 7, 1924. 1,510,569
O. E. SZEKELY
AUTOMOTIVE DRIVE MECHANISM
Filed Aug. 21, 1922 4 Sheets-Sheet 2
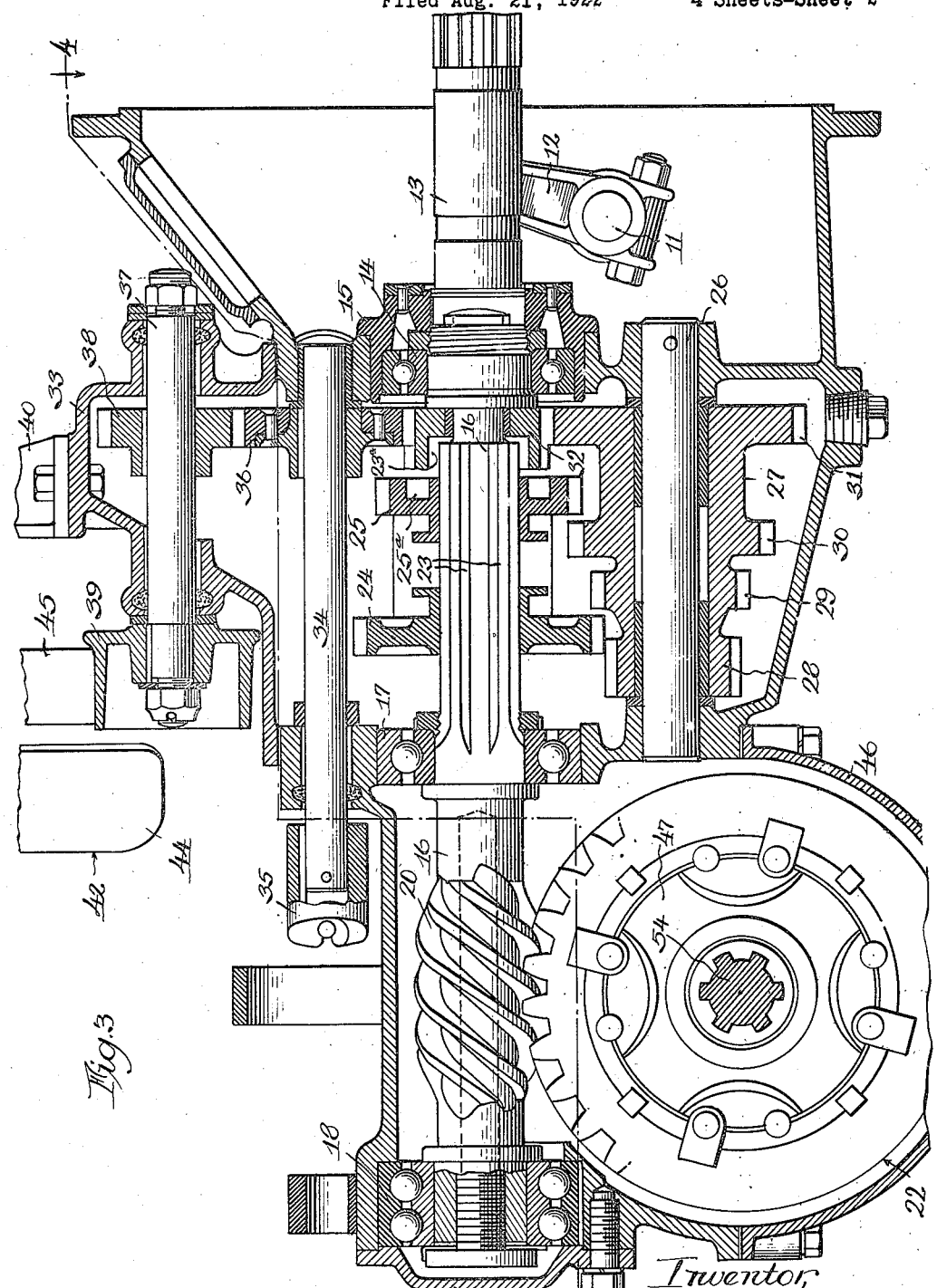
Inventor,
Otto E. Szekely,
By Offield, Poole, Hinton & Scott
Attys.

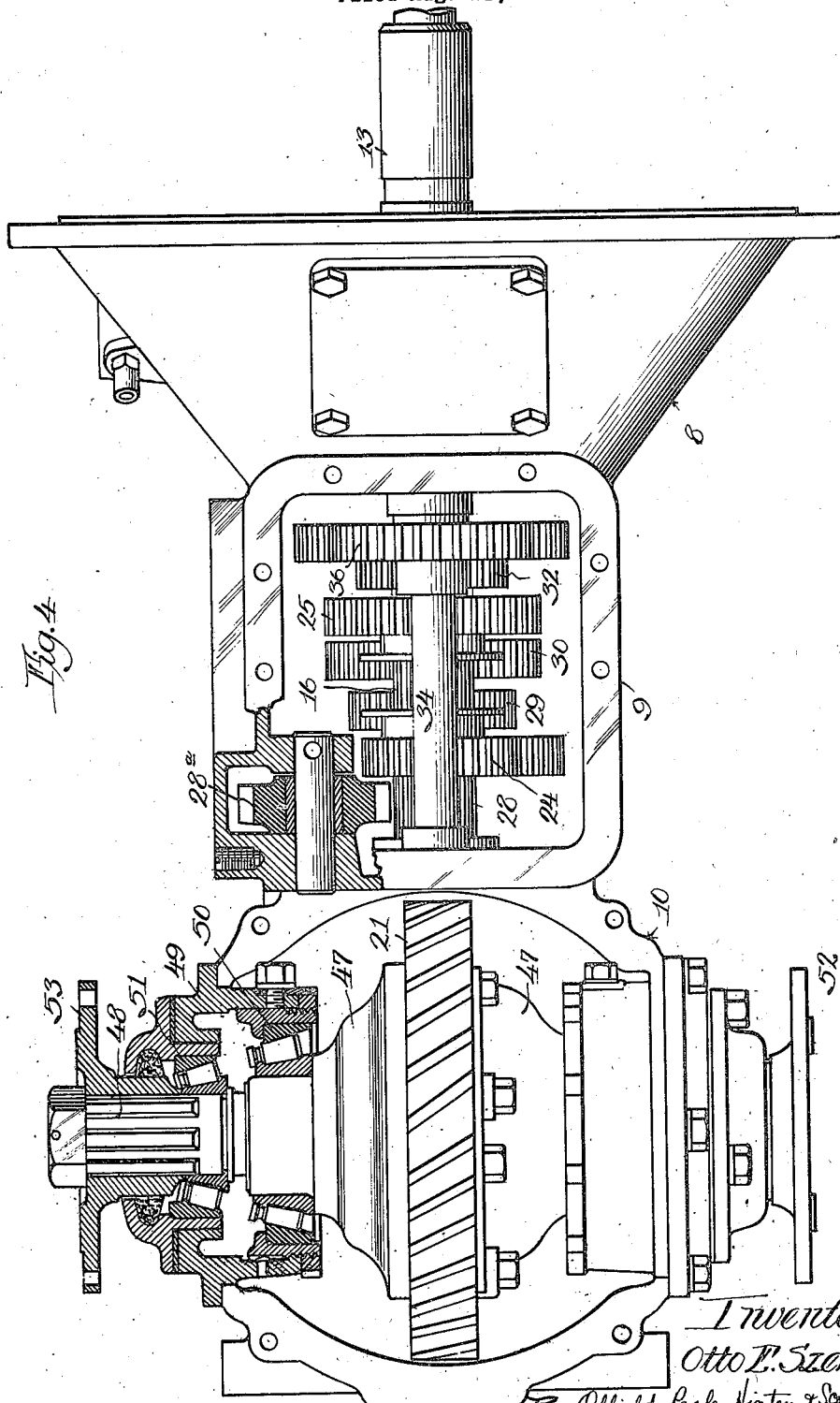

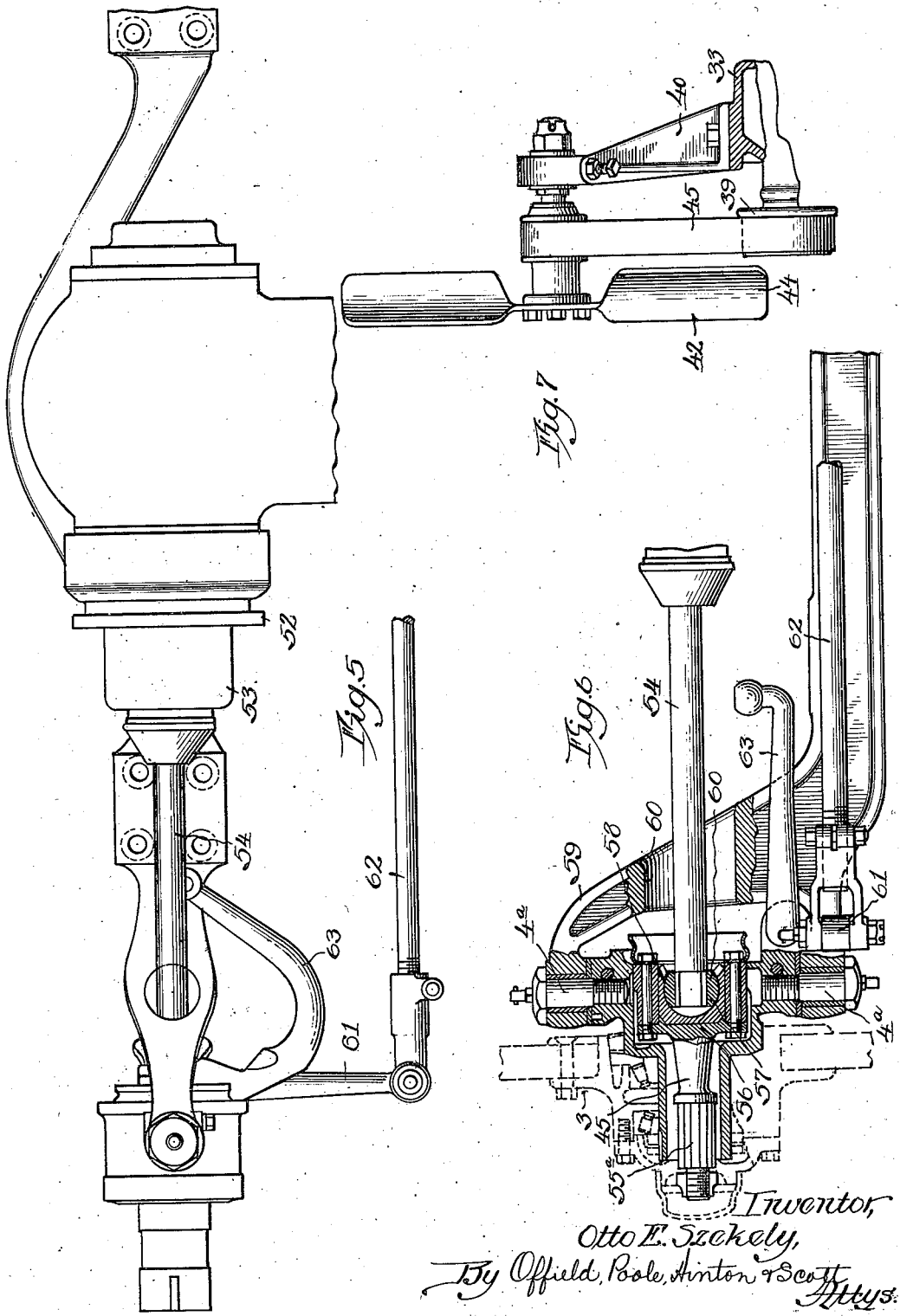

Patented Oct. 7, 1924.

1,510,569

UNITED STATES PATENT OFFICE.

OTTO E. SZEKELY, OF MOLINE, ILLINOIS.

AUTOMOTIVE DRIVE MECHANISM.

Application filed August 21, 1922. Serial No. 583,189.

*To all whom it may concern:*

Be it known that I, OTTO E. SZEKELY, a citizen of the United States, and a resident of Moline, in the county of Rock Island and State of Illinois, have invented certain new and useful Improvements in Automotive Drive Mechanism, of which the following is a specification.

This invention relates to improvements in automotive drive mechanism, and more particularly to mechanism for driving a motor vehicle through the forward wheels, this arrangement being commonly termed a front drive, as distinguished from the more common rear axle drive.

In a "front drive" vehicle, the motor is located in its usual position at the forward end, although the associated mechanisms are reversed, the transmission being immediately forward of the motor and drives through a differential gearing and jack shafts to the front wheels, there being provided universal joints between the differential and the wheel spindles to permit the same to turn in steering.

The object of the invention is to provide a new and novel construction for a so-called front drive steering mechanism, embodying certain distinct improvements in structure and design and whereby greater compactness, increased lightness and more efficient power transmission is directly promoted.

Reduction in the number of driving parts, and bearings, accessibility to the enclosed parts of the mechanism for repair, and a general unification of auxiliary driven mechanisms are other objects sought to be attained, these and others being hereinafter set forth more at length in the course of the following discussion in connection with the accompanying drawings wherein:

Fig. 3 is an enlarged view in vertical section of the driving mechanism taken on line 3—3 of Figure 2.

Fig. 4 is a partial top plan and sectional view of the drive mechanism as taken on line 4—4 of Figure 3.

Fig. 5 is a fragmentary top plan view of the final drive showing the differential and axle assembly.

Figure 1:
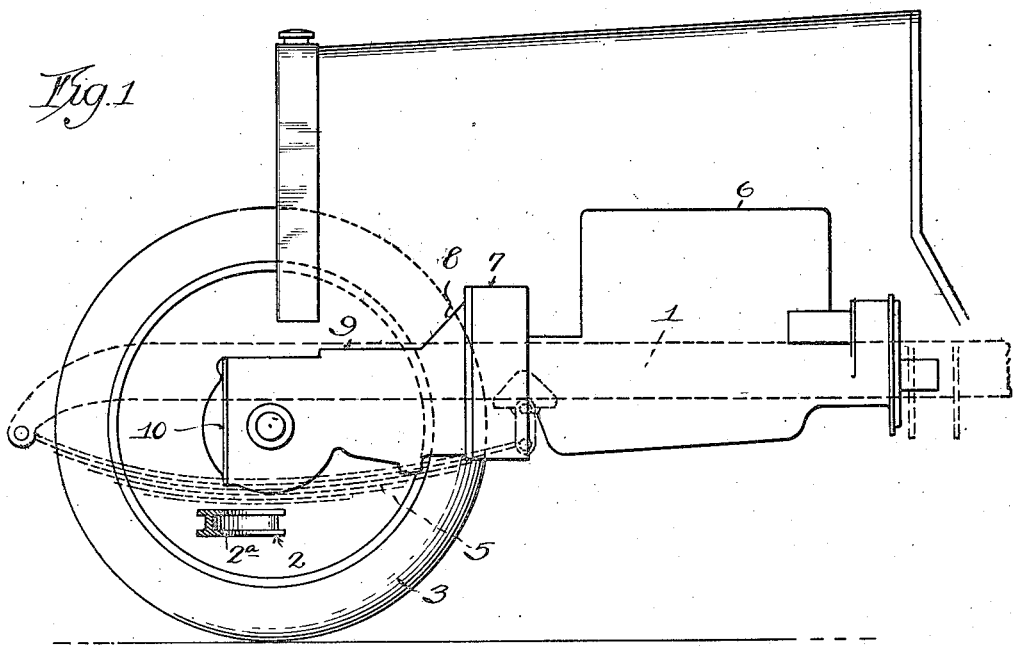
Fig. 1 is a view in side elevation of a vehicle showing the arrangement of the driving mechanism.
Figure 2:
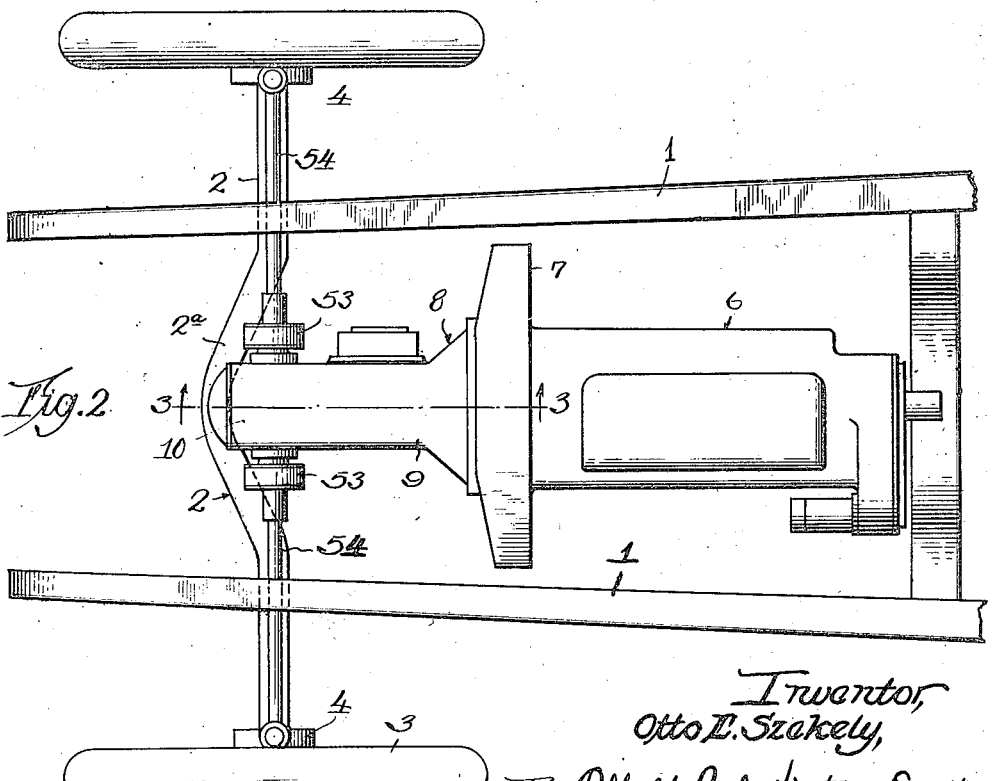
Fig. 2 is a top plan view of the drive.

Fig. 6 rear view of the axle and wheel drive assembly with parts shown in vertical section, and, Fig. 7 is a detail view in vertical section showing the fore unit.

The vehicle in which the driving mechanism embodying the invention is installed, is substantially of the standard design, the chassis comprising the usual side frame members 1, front and rear axles, and wheels.

The drawings however, disclose only the forward portion of the vehicle chassis, namely: the front axle 2, wheels 3, journalled on spindles 4, pivotally connected to the ends of the front axle for steering, and the springs 5.

The motor 6 is hung between the side frame members 1, 1 at the forward end of the chassis, although as heretofore suggested, is reversed so that the fly wheel housing 7, and the bell housing 8, containing the fly wheel and clutch mechanism respectively is at the forward end of the motor. Immediately in front of the bell housing 8, is the transmission casing 9, and in front of the transmission casing is the differential housing 10, the latter being located above the front axle 2.

Beyond the transmission gearing is the differential, propeller shafts and wheel axles, these constituting the final drive.

As a preferred construction, the bell housing 8 which is bolted flush to the fly wheel housing 7, the transmission casing 9, and the upper portion of the differential housing 10, are cast integral, and form a single unit thereby simplifying the construction and diminishing the weight of metal.

The clutch mechanism is of the usual construction including a rock shaft 11, and yokes 12, operatively connected with the throw-out device. The rock shaft is connected with the usual clutch pedals.

The crank shaft of the motor drives a shaft 13, through the intermediate clutch mechanism, said shaft being journalled in a roller bearing 14, supported in a bearing retainer 15, at the junction of the bell housing 8, and transmission casing 9. Extending lengthwise of the transmission casings is the primary drive shaft 16, piloted at its inner end in a socket formed in the end of the shaft 13, and journalled in a roller bearing 17, at the forward end of the casing. The primary shaft is extended into the differential housing and is journalled at its extremity in a double roller thrust bearing 18, mounted within an annular bearing retainer socket, and covered by a cover plate 19, to protect the same from dust and dirt. Intermediate the bearings 17 and 19, a spiral driving pinion 20, is cut in the primary drive shaft 16 and which meshes with the ring gear 21, of the differential gearing 22, immediately below.

The portion of the primary drive shaft within the transmission casing 9, is provided with longitudinal splines 23, and carries two sliding gears 24 and 25, these being the low and intermediate primary gear wheels, respectively. The usual form of gear shifting devices are employed to shifting these gear wheels, and therefore need not be disclosed.

Immediately below the primary shaft 16 is the secondary shaft consisting of an axle shaft 26, extending parallel to the primary shaft, and a gear member 27, comprising integral gear wheels, 28, 29, 30 and 31 (from left to right) constituting the reverse, low intermediate and high secondary change speed gears respectively.

The reverse gear 28, drives through the usual idler gear 28$^a$, located at one side, and thence to the primary shaft, through primary gear 24, the latter also, meshing with secondary gear 29, for low speed. The primary gear 25 meshes with secondary gear 30 for intermediate or second speed. Secondary gear 31, meshes with a spur gear 32, fixed to the end of the main drive shaft 13, for driving the integral secondary gear member 27.

For driving at the high speed the gear wheel 25 is shifted to the right, into clutching engagement with the gear wheel 32, by means of gear teeth 25$^a$ and 32$^a$, provided on the opposing hub faces of said gear wheels. In this manner direct drive from main to primary shafts is provided for at the high speed. The change speed mechanism herein disclosed is the conventional type, and further explanation is therefore thought to be unnecessary.

Immediately above the transmission casing 9, is mounted the fan unit, comprising a housing 33, which is bolted over the open top of said casing. Just below the housing 33, and journalled in bearings formed at opposite ends of the transmission casing is a starting crank shaft 34, having the usual slotted sleeve 35, mounted at the forwardly projecting end to receive the starting crank. At the rear end of the starter shaft is keyed a fiber pinion 36, extending a short distance upwardly into the housing 33. Journalled in the housing 33, and parallel with the starter shaft 34, is a pulley shaft 37, carrying a fixed gear wheel 38, meshing with the fiber pinion 36. The forward end of the shaft 37, projects from the housing 33, and carries a belt pulley 39. Mounted upon the top of the housing is a fan supported bracket 40, supporting at its upper end a spindle (not shown), in which a fan 42 is mounted, said fan comprising a hub (not shown), and radial blades 44. On the hub 43 is formed a pulley (not shown), in vertical alignment with the lower driving pulley 39. said pulleys being connected by a fan belt 45.

The mounting and driving of the fan, is a feature that tends toward economy and simplicity, the entire fan driving parts being a complete unit on the housing 33, which can be readily removed as such, if access to the transmission casing is desired. Furthermore, the starter shaft, which would seldom be used where an electric starting motor is employed, is utilized as an idler between the main shaft 13 and the pulley shaft 37, and provides the direct drive from one to the other, through the gear wheels 32, 36 and 38, said intermediate gear being of fiber to reduce the noise. Thus a short direct drive is provided for the fan, eliminating the usual counter-shaft, and putting the starter shaft to a practical use.

As herein before mentioned, the differential housing is located just above the front axle 2, and owing to its shape and size, the central portion of the axle is bowed or rounded outwardly, as at 2$^a$, thereby affording clearance for the housing.

As herein before mentioned the upper portion 10, of the differential housing is integral with the transmission casing 9, the under portion or half being a removable casing 46, of semi-circular form bolted to the upper portion 10.

The differential gearing is of the standard planetary type, journalled in its housing, and serving the usual function, of compensating for the variation in the propeller shafts, due to the different speeds of rotation of the drive wheels when the vehicle is traveling in a curvilinear path, as for instance, in making a turn. The purpose and construction of a differential as used in a motor vehicle is so well known that a detailed description may be omitted.

The ring gear 21, is driven from main drive pinion 20, both being spiral gear wheels, and lying in the same vertical plane. The ring gear in turn drives two internal gear wheels through the medium of planetary pinions carried by said ring gear. The internal gears and pinions of the differential are not shown, but the former are represented by the two differential elements 47, 47 on either side of the ring gear 21, which are adapted to rotate about the axis of the differential, at different speeds.

These differential elements 47, have axial bores at their outer ends which are splined, and stub shafts 48, are fitted into these bores. Mounted in the end openings of the differential housing are bearing retainers 49, which carry an inner and outer thrust roller bearing, 50 and 51. The inner bearing supports the ends of the differential elements 47, and the outer bearing the stub shaft 50, there being fixed to the end of each stub shaft a differential flange 52, to which is bolted a universal joint 53. These universal joints are located just beyond the differential and are of the usual ball and socket type, enclosed within a protective boot of leather. Extending outwardly from the universal joints 53, are the propeller shafts 54, 54 extending to the wheel spindles 4, and having driving connections with the front wheels in the following manner. Journalled in the spindle 4, is a live axle 55, extending axially of the spindle and having non-rotative connection with the wheel 3, throughout the splined end portions 55ª. At the inner end of the axle a cylindric bearing portion 56, is formed, having an inwardly opening cavity in which is retained the socket member 57 of the outer universal joint, the ball member 58, thereof being keyed to the end of the propeller shaft 54.

As is the practice, usually adopted where the driving wheels are also the steering wheels, the universal joint is located at the intersection of spindle or wheel axis, and the axis of the spindle trunnions 4ª, 4ª which are journalled in bearings provided at the upper and lower ends of the yokes 59, 59 formed at the ends of the dead axle 2. Because of these yokes, it is noted that the upper arms are formed with transverse openings 60, through which the propeller shaft 54, extends. The usual members form the associated parts of the steering gear, namely, rearwardly extending steering arms 61, 61 connected by a cross rod 62, and a steering knuckle 63. The parts associated with the front wheel is for the most part standard practice, and hence requires no detailed description.

A number of mechanical advantages result from the drive mechanism herein disclosed. The close coupled arrangement of the complete power plant has already been alluded to as the result of driving through the front axle, this manifestly being the result of motor, transmission and differential being located at the forward end, of the chassis and under the hood, thus making all parts accessible for examination and repair.

The integral construction of the drive mechanism casing, consisting of the separate bell housing transmission casing and one-half of the differential housing, already mentioned, provides an integral structure which is dropped in place and bolted to the fly wheel housing of the motor as a unit. This integral construction coupled with the short distances between the separate units, permits the use of short power connections, and hence a less number of supporting parts, (such as bearings), and generally permitting of a lighter construction throughout. Efficiency in power transmission is thus materially increased, to the end that a smaller motor will accomplish the same results as a larger motor for the same weight vehicle, equipped with the more common rear axle drive.

A prominent feature resulting from the closely coupled units, is the use of an integral or single drive shaft 16, which extends through the transmission to the differential, thus providing a short straight drive from motor to the final drive, i. e., the differential and parts beyond. The use of a spiral gear drive to the differential further enables the straight drive to be accomplished, this being done without raising or lowering the center line of the differential with respect to the center line or axis of the drive shaft.

The elimination of side pressure or thrust exerted by the differential, on its bearings and carriers, is a mechanical advantage derived from the straight spiral drive, this being not the case where the usual bevel gear and pinion drive is used in driving forwardly, the thrust is inwardly toward the differential and is resisted by the double set of tapered roller bearings 50 and 51, which also support the radial load of the differential. These roller thrust bearings while supported in the integral bearing carriers 49, 49 are nevertheless adjustable independently, so that, proper alignment of the differential ring gear 21, with the spiral pinion 20, can be readily maintained. In driving in reverse, the thrust is in the opposite or outward direction, this thrust being compensated for by the double set of ball bearings 18, at the outer end of shaft 16.

A further advantage from the standpoint of weight distribution and riding qualities, resides in the fact that the transmission and differential are carried by the frame, so that the unsprung load is greatly reduced, to the end that wheels and springs are not required to lift the weight of the differential and associated parts, the same moving with the remaining portions carried by the frame. The location of the driving mechanism just behind the front driving wheels, transforms the driving action into a pulling rather than a pushing of the weight, this being an advantage in the climbing of hills and inclines. The elimination of a heavy rear axle is also a feature that tends toward lightness in construction.

The novel features of the fan assembly and drive has herein before been mentioned, attention having been directed to the unitary arrangement, the simplicity and directness of the drive, and ease with which the complete fan unit can be removed to gain access to the transmission casing without disturbing other parts.

Having described the novel feature of construction for a front drive mechanism, and mentioned a few of the practical advantages thereof,

I claim as my invention:

1. In an automotive drive mechanism, the combination of a motor, a transmission casing mounted forwardly of said motor, a fan and fan driving mechanism, a housing mounted upon said transmission casing and forming a unitary support for said fan driving mechanism, and means operatively connecting said fan driving mechanism with the motor.

2. In an automotive drive mechanism, the combination of a motor, a transmission casing mounted forwardly of said motor, and provided with an opening in the top wall thereof, and change speed gearing mounted therein, a housing mounted upon said casing over said opening, and forming a unitary support for said fan and fan driving mechanism, and intermediate driving members between said transmission gearing and said fan driving mechanism.

3. In an automotive drive mechanism, the combination of a motor, a transmission casing mounted forwardly of said motor, and provided with an opening in the top wall thereof, a removable housing mounted over said opening, a fan mounted on said housing and fan driving mechanism journalled therein, and means connecting said fan driving mechanism with the motor drive shaft.

4. In an automotive drive mechanism, the combination of a motor, a transmission casing mounted forwardly of said motor, and provided with an opening in the top wall thereof, and change speed gearing mounted therebelow, including a spur gear in direct driving connection with said motor, a housing mounted upon said casing over said opening, a fan and fan driving mechanism mounted upon, and journalled in said housing, in driving connection with said pinion.

5. In a front wheel driving mechanism for vehicles, the combination of a motor, a transmission casing in front of said motor, change speed gearing in said casing, including a pinion in direct driving engagement with said motor, a starting shaft journalled in said transmission casing, and provided with a gear wheel meshing with said pinion, said casing being open at its top, and a housing over said open top, and supporting a fan driving unit, comprising a gear wheel medium with said starter shaft gear wheel pinion.

6. In a front wheel driving mechanism for vehicles, the combination of a motor, a transmission casing in front of said motor, change speed gearing in said casing, including a pinion in direct driving engagement with said motor, a starting shaft journalled in said transmission casing and immediately below an opening in the top thereof, and a housing removably mounted on said transmission casing and covering said opening, and a fan and fan driving unit mounted on said housing and comprising a pulley shaft above said starter shaft, provided with a gear wheel said starter shaft carrying a fiber pinion acting as an idler between said pulley shaft gear wheel and said motor driven pinion.

7. In an automotive drive mechanism, the combination of a motor, a transmission casing mounted forwardly of said motor, change speed gearing mounted in said casing, comprising a pinion in direct driving connection with said motor, a starter shaft journalled in said casing and having a gear wheel meshing with said pinion, a removable housing mounted on top of said casing, a shaft journalled in said housing, a pulley fixed to said shaft and a gear wheel meshing with said starter shaft gear wheel, and an arm mounted on said housing, and supporting a fan, comprising a spindle and a fan belt connecting said spindle, and said pulley.

In witness whereof, I hereunto subscribe my name this 26 day of July, A. D. 1922.

OTTO E. SZEKELY.